United States Patent
Hester et al.

(10) Patent No.: US 6,925,064 B2
(45) Date of Patent: Aug. 2, 2005

(54) METHOD AND APPARATUS FOR DISCOVERING NEIGHBORS WITHIN A PICONET COMMUNICATION SYSTEM

(75) Inventors: Lance E. Hester, Plantation, FL (US); Jian Huang, Coral Springs, FL (US); Yan Huang, Weston, FL (US); Padmaja Ramadas, Davie, FL (US); Matthew R. Perkins, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 146 days.

(21) Appl. No.: 10/660,393

(22) Filed: Sep. 11, 2003

(65) Prior Publication Data

US 2005/0058084 A1 Mar. 17, 2005

(51) Int. Cl.[7] ............................................. H04L 12/28
(52) U.S. Cl. ........................................ 370/255; 370/312
(58) Field of Search ................................ 370/254, 255, 370/338, 351, 310, 218, 314, 321, 331, 332, 329, 328, 312, 337, 347, 349; 709/242, 239; 455/507, 517, 524, 525, 463

(56) References Cited

U.S. PATENT DOCUMENTS

| | | | | |
|---|---|---|---|---|
| 6,504,829 B1 | * | 1/2003 | Young et al. | 370/337 |
| 6,535,498 B1 | * | 3/2003 | Larsson et al. | 370/338 |
| 6,646,603 B2 | * | 11/2003 | Dooley et al. | 342/458 |
| 6,691,173 B2 | * | 2/2004 | Morris et al. | 709/249 |
| 6,704,293 B1 | * | 3/2004 | Larsson et al. | 370/255 |
| 6,718,394 B2 | * | 4/2004 | Cain | 709/242 |
| 6,751,200 B1 | * | 6/2004 | Larsson et al. | 370/255 |
| 6,775,258 B1 | * | 8/2004 | van Valkenburg et al. | 370/338 |
| 2002/0061009 A1 | * | 5/2002 | Sorensen | 370/351 |
| 2002/0142721 A1 | * | 10/2002 | Souissi et al. | 455/41 |
| 2003/0076842 A1 | * | 4/2003 | Johansson et al. | 370/401 |

* cited by examiner

Primary Examiner—Wellington Chin
Assistant Examiner—Brenda Pham
(74) Attorney, Agent, or Firm—Kenneth A. Haas

(57) ABSTRACT

In order to discover neighboring nodes (203, 207, 208) within a particular piconet, a first node (206) determines a list of all nodes (205–207) within its piconet (201) and then transmits to each node within the piconet, a message requiring a response. Depending upon which nodes are heard from, a list is formulated by the first node comprising those nodes neighboring the first node. In order for neighboring nodes within other piconets to "discover" the first node, the first node will also scan its environment to determine piconet identifications for other piconets, and then broadcast a "discovery" message having a piconet identification of a neighboring piconet. In a similar manner, the first node will also scan its environment to determine discovery messages transmitted by other nodes, thus determining neighboring nodes outside its piconet.

6 Claims, 5 Drawing Sheets

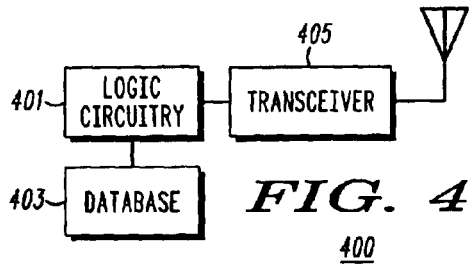
FIG. 4
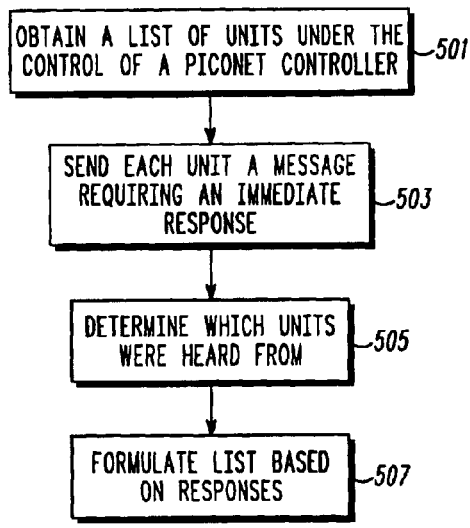
FIG. 5
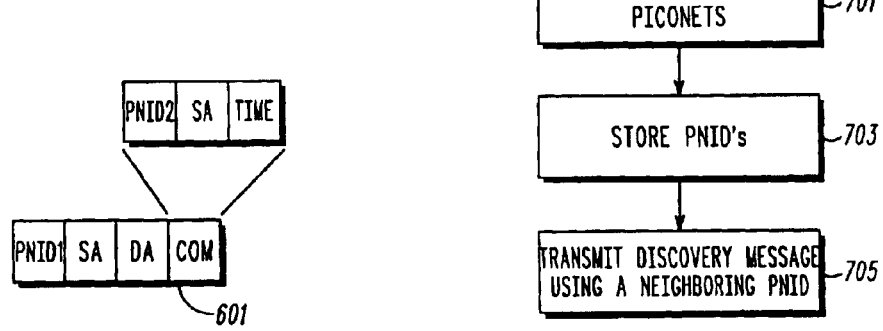
FIG. 6
FIG. 7

METHOD AND APPARATUS FOR DISCOVERING NEIGHBORS WITHIN A PICONET COMMUNICATION SYSTEM

FIELD OF THE INVENTION

The present invention relates generally to piconet communication systems and in particular, to a method and apparatus for discovering neighbors within a piconet communication system.

BACKGROUND OF THE INVENTION

A piconet is a wireless ad hoc data communication system, which allows a number of data devices (nodes) as members to communicate with each other. A piconet distinguishes itself from other types of data networks in that communications of a node are normally confined to about 10 meters in all directions, whether the node is stationary or in motion. Typical piconets overlap so that they create a logical communication backbone underpinned by the physical radio connections that exist between devices in the various piconets. All piconets must have a single piconet controller (PNC), or coordinator in each piconet. This coordinator is responsible for timing synchronization of the devices within its piconet, for assigning unique network addresses, for routing messages, for broadcasting device discovery and service discovery information, and possibly for power control.

In such piconet communication systems, it has become desirable for a given node to determine which neighboring nodes are within its transmission range. Such knowledge aids in determining location information for a given node. At the same time, knowing one's neighbors is necessary for routing/relaying data and control messages.

While determining neighboring devices within a piconet is desirable, there currently exists no method for determining which nodes are within communication range of each other, including those nodes that are not part of a given node's piconet. At most, a given node can poll its coordinating device and determine those nodes in communication range ("ear shot") with that coordinating device, but such information does not ensure that a given node is within range of any particular node under the coordinator. Therefore, a need exists for a method and apparatus for discovering neighbor nodes within such piconet communication systems.

BRIEF DESCRIPTION OF THE DRAWINGS

FIG. 4 is a block diagram of a node.

FIG. 5 is a flow chart showing operation of the node of FIG. 4.

FIG. 6 illustrates a "discovery" message transmitted by nodes within the communication system of FIG. 1.

FIG. 7 is a flow chart showing operation of a node wishing to be "discovered" by neighboring nodes.

DETAILED DESCRIPTION OF THE DRAWINGS

Figure 1:
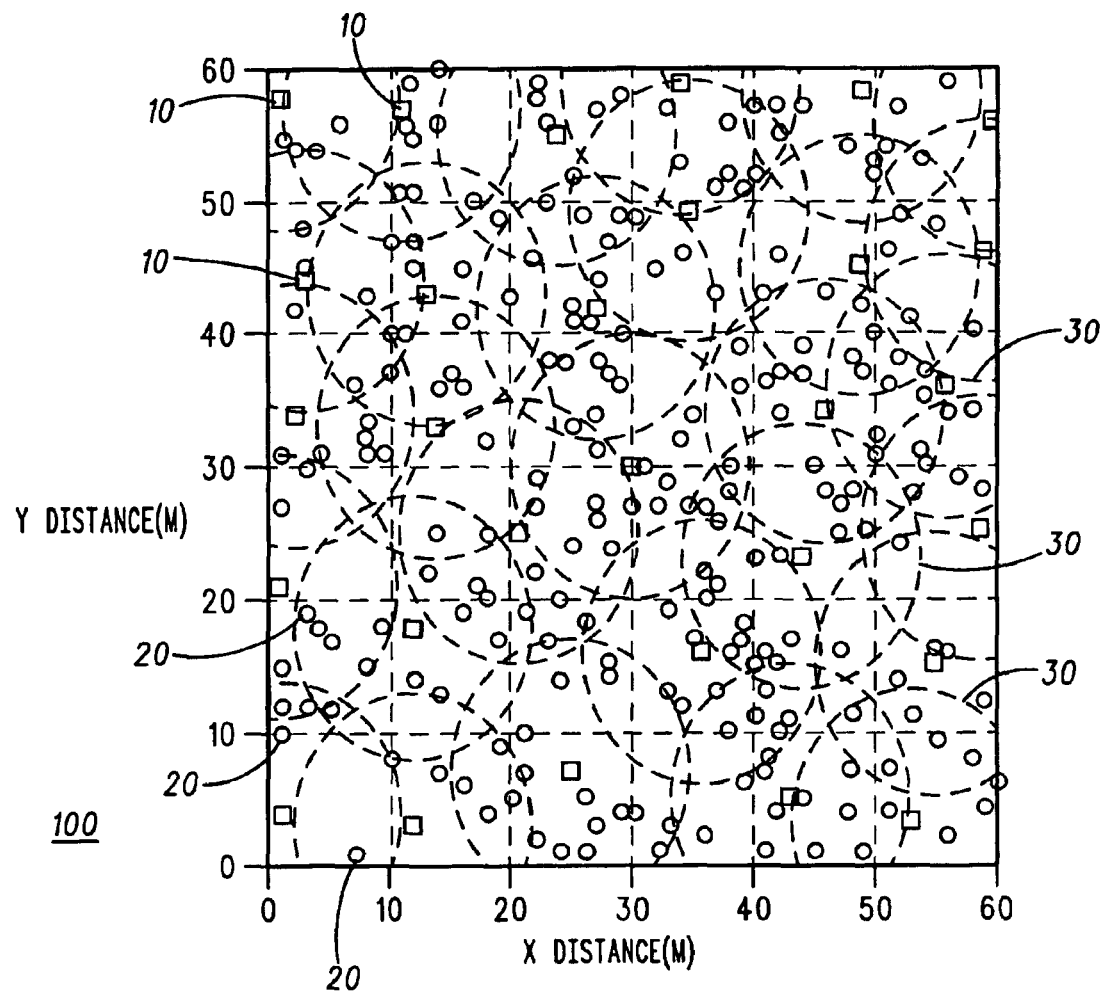
FIG. 1 is a block diagram of a communication system.

In order to address the above-mentioned problem, a method and apparatus for discovering neighbors within a piconet communication system is provided herein. In order to discover neighboring nodes within a particular piconet, a first node determines a list of all nodes within its piconet and then transmits, to each node within the piconet, a message requiring a response. Depending upon which nodes are heard from, a list is formulated by the first node comprising those nodes neighboring the first node. In order for neighboring nodes within other piconets to "discover" the first node, the first node will also scan its environment to determine piconet identifications for other piconets, and then broadcast a "discovery" message having a piconet identification of a neighboring piconet. In a similar manner, the first node will also listen to its environment to determine discovery messages transmitted by other nodes, thus determining neighboring nodes outside its piconet.

By practicing the above techniques, a particular node within a piconet communication system will be able to determine all neighboring nodes, whether associated with the same piconet or not. As discussed above, such knowledge aids in determining location information for a given node as well as adding in the routing/relaying of data and control messages.

The present invention encompasses a method for finding neighbors within a piconet, wherein the neighbors are under the control of a single piconet controller. The method comprises the steps of determining all nodes under the control of the piconet controller, sending each node under the control of the piconet controller a message requiring a response, and receiving the response from a plurality of nodes under the control of the piconet controller. A determination is made as to which nodes responded to the message, and a list is formulated of neighbors within the piconet based on the determination of which nodes responded to the message.

The present invention additionally encompasses a method for finding neighboring nodes within a second piconet while being associated with a first piconet. The method comprises the steps of associating a node with the first piconet, determining neighboring piconet identification, and broadcasting, by the node, a message during a time slot reserved for transmissions within the first piconet, wherein the message comprises the neighboring piconet's identification, the first piconet's identification, and the identification of the node.

The present invention additionally encompasses a method for operating a node within a piconet communication system. The method comprises the steps of associating the node with a first piconet controller, operating the node associated with the first piconet controller as an independent piconet controller, and determining nodes that associate with the node while acting as the independent piconet controller. Piconet control status is relinquished and the node is re-associated with the first piconet controller.

The present invention encompasses an apparatus comprising a transceiver sending each node under a control of a piconet controller a message requiring a response and receiving the response from a plurality of nodes under the control of the piconet controller, and logic circuitry determining which nodes responded to the message and formulating a list of neighbors within the piconet based on the determination of which nodes responded to the message.

The present invention additionally encompasses an apparatus for finding neighboring nodes within a second piconet while being associated with a first piconet, the apparatus comprising logic circuitry associating a node with the first piconet and determining the second piconet's identification, and a transceiver broadcasting a message during a time slot reserved for transmissions within the first piconet, wherein the message comprises the second piconet's identification, the first piconet's identification, and the identification of the node.

The present invention additionally encompasses an apparatus comprising logic circuitry associating a node with a first piconet controller, become a dependent piconet controller, determining nodes that associate with the node while acting as the dependent piconet controller, relinquishing piconet control status, and resuming normal device operation for the node under the first piconet controller.

Turning now to the drawings, wherein like numerals designate like components, FIG. 1 illustrates communication system 100 in accordance with the preferred embodiment of the present invention. Communication system 100 preferably utilizes a communication system protocol defined by IEEE 802.15.3 Wireless Personal Area Networks for High Data Rates, however one of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . , etc. As shown, communication system 100 includes a number of piconets, each comprising a coordinating device 10 and a larger number of slave nodes 20 in communication with coordinating device 10. Nodes 20 represent devices that communicate with each other through synchronization provided by coordinating devices 10. Nodes 20 can be transportable (mobile) or they can be fixed in a given place.

As described above, it is desirable for any given node 20 within a particular piconet to determine those nodes that are within communication range of the given node. Prior-art communication systems allow a device that joins or associates to a piconet, to obtain a list of the members of the piconet by querying the controller for "roll call" like information via an 802.15.3 PNC information request command or Probe Command Message. As discussed above, while this information allows any node within a piconet to determine all nodes within the piconet, it does not provide any information as to which of these nodes are within communication range of a particular node. This can be illustrated in FIG. 2, which shows two piconets 201 and 202 having respective controllers 203 and 204. In this illustration, nodes 205–207 are associated with controller 203 (piconet 201), while node 208 is associated with controller 204 (piconet 202). In prior-art piconets, a particular node (e.g., node 206) can poll its controller (controller 203) to determine those nodes in communication with controller 203, however this information itself will not determine those nodes within communication range of node 206. For example, when polled, controller 203 will provide node 206 with the identifications of nodes 205–207, however, in this example, node 205 is currently outside the communication range of node 206.

Notwithstanding the above, there currently exists no way for a node within a given piconet to determine those nodes that are within communication range, yet associated with a different piconet. This can again be illustrated with reference to FIG. 2. When node 206 polls, its controller, node 206 will be provided with only those nodes in communication with controller 203. Thus, even though node 208 is within the communication range of node 206, node 206 will have no way of knowing this information.

In order to address the above issues, communication system 100 is configured to provide mechanisms for a particular node within a given piconet to determine those nodes within communication range of the particular node, independent of piconet association. In order to accomplish this task, a node wishing to discover neighboring nodes must first determine those nodes within its piconet that are within communication range, and then must determine those nodes outside the node's piconet that are within communication range. The following description will be broken down into two parts, firstly, the techniques employed by a particular node to discover neighboring nodes within its piconet, and secondly, techniques employed by a particular node to discover those neighboring nodes associated with a different piconet.

Figure 2:
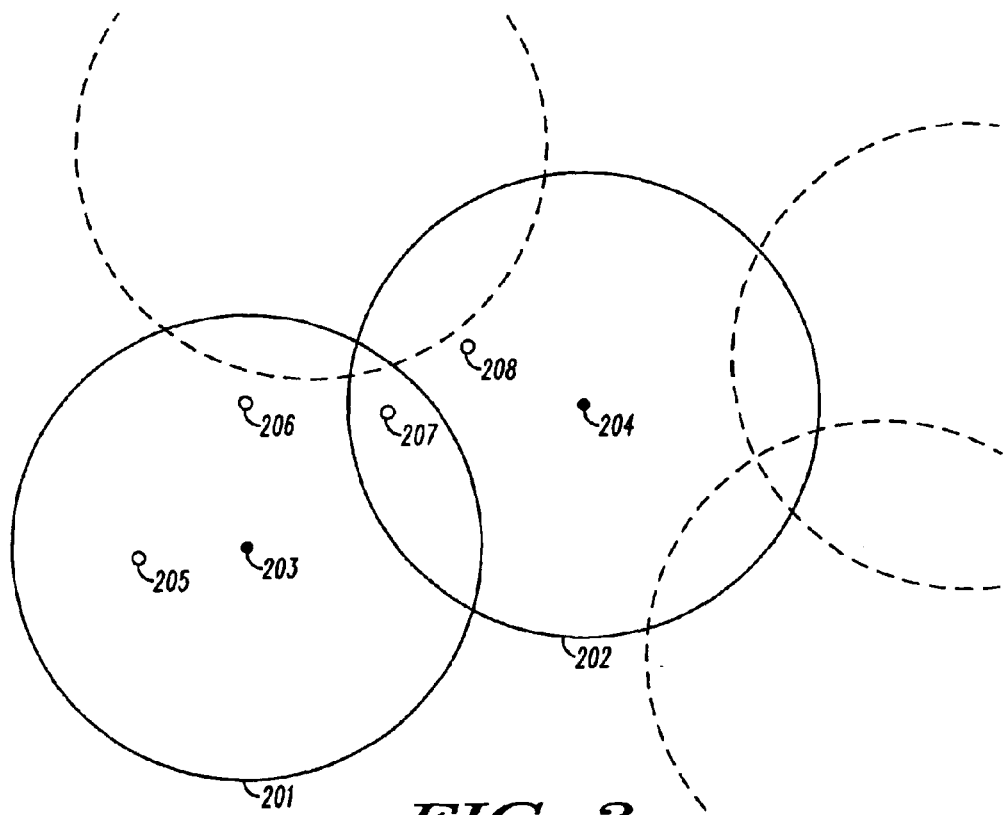
FIG. 2 is a more-detailed block diagram of the communication system of FIG. 1.
Figure 3:
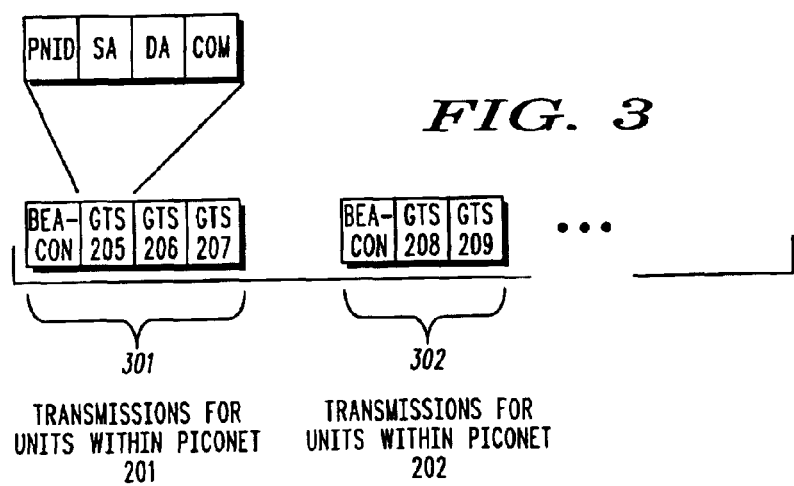
FIG. 3 illustrates a transmission scheme for the communication system of FIG. 1.

Prior to describing the above techniques, it is necessary to set forth background information with reference to FIG. 2 and FIG. 3. Particularly, during communications among devices, a specific transmission protocol is utilized by communication system 100 wherein each piconet communicates within a particular non-overlapping superframe 301, 302 as described in application Ser. No. 10/414,838, which is incorporated by reference herein. In FIG. 3, piconet 201 completes all necessary transmissions within superframe 301, while piconet 202 completes all necessary transmissions within superframe 302. During a superframe, a particular controller of the piconets will broadcast piconet timing and control information within a beacon field, while each node (including the controller) will have a Contention Free Period slot, part of the Channel Time Allocation (CTA) facility of the IEEE 802.15.3 standard, for transmission. During its guaranteed time slot, a particular node broadcasts any command wishing to be executed to any particular node or may send data intended for a single node or set of nodes. Such broadcasts must include the identification of the piconet(s) a node is associated with (i.e., a piconet identifier (PNID)), along with a source address (SA, or device identifier (DEVID)), a destination address (device identifier (DEVID or DA)) and the command (COM). This is illustrated in FIG. 3 with the expanded view of the GTS for node 205.

Determination of Neighboring Nodes within the Same Piconet

FIG. 4 is a block diagram of node 400 for utilization within communication system 100. As shown, node 400 comprises logic circuitry 401, database 403, and transceiver 405. Logic circuitry 401 preferably comprises a microprocessor controller such as, but not limited to a Motorola PowerPC microprocessor. Database 403 preferably comprises storage means such as but not limited to hard disk storage, random access memory, . . . , etc. Finally, transceiver 405 comprises well known transmit and receive circuitry for communication within an 802.15.3 network.

As an associated member of the piconet, a device is able to request network information from the controller about a single device or all the devices in the piconet. A device wishing to determine all its physical neighbors that are members of its piconet will send out a piconet information request command to the controller to obtain a list of all the devices in the piconet. Conversely, the controller may broadcast the information in a single transmission depending upon the number of piconet devices and the duration of the controller's superframe. A node may then determine all units under the control of the piconet controller by listening to the broadcast. Thus, logic circuitry 401 obtains a list of all nodes within its piconet by either instructing transceiver 405 to poll its associated piconet for a list of all nodes that are currently part of the piconets, or alternatively, instructing transceiver 405 to periodically listen to this information broadcast by the piconets controller. Once obtained, the list of devices is stored in database 403.

Once node 400 has acquired and stored the piconet device list, it then sequentially polls each device by transmitting a data frame packet with an immediate acknowledge requirement, (Imm-ACK) policy field set (section 8.8.2 of IEEE 802.15.3, draft D15) during its CTA. In other words, logic circuitry 401 instructs transceiver 405 to transmit a command within its CTA, with the command requiring an immediate response. If the intended recipient of a directed frame correctly receives the data frame, then it will send the Imm-ACK back during the same CTA. Thus, node 400 will know for sure if the device is within physical transmission range based on a determination (via logic circuitry 401) of which nodes responded to the message. A list of neighbors can them be determined based on those nodes that responded to the message.

If node 400 should not receive an Imm-ACK, it will retry for a maximum number of retries (e.g., five) in subsequent superframes. Once the maximum number of retries has been reached, node 400 will no longer attempt to send data directly to this device. By this approach, node 400 learns about all the devices that are within its transmission range. This information is stored in database 403.

FIG. 5 is a flow chart showing operation of node 400 during acquisition of neighboring nodes under the same piconet. The logic flow begins at step 501 where logic circuitry 401 obtains a list of units (nodes) under the control of its piconet controller. As discussed above, this may be accomplished by polling the controller with a PNC information request command or Probe Command message, or alternatively, this may be accomplished by instructing transceiver 405 to periodically listen for this information broadcast as part of the controller's beacon. Once the list has been obtained, logic circuitry 401 instructs transceiver 405 to send each unit a message requiring an immediate response (step 503). A response is received from various nodes and at step 505, logic circuitry 401 determines which units were heard from, and at step 507 a list is formulated by logic circuitry 401 based on the received acknowledgments. As is evident, for FIG. 2, the number of nodes responding may be less than the total number of nodes/units under the command of the piconet controller.

The preceding technique allows any node within a particular piconet to discover those neighboring nodes within that piconet. As discussed above, however, there currently exists no way for a node within a given piconet to determine those nodes that are within communication range, yet associated with a different piconet. The following discussion addresses this issue.

Determination of Neighboring Nodes within Differing Piconets

As discussed above, each node within a piconet will have its own CTA. As shown in FIG. 3, during transmission within a CTA, a node will be able to broadcast various commands using its PNID during the transmission. Currently, the 802.15.3 reception protocol only allows a node to receive transmissions from other nodes that broadcast with the PNID in which the receiving node is associated with. Thus, nodes within prior-art 802.15.3 systems only hear transmissions of other nodes within the same piconet (i.e., having the same PNID).

In order to allow nodes within communication system 100 to determine nodes in close proximity, it is necessary to allow each node to hear transmissions from other nodes, regardless of the PNID utilized during transmission. A specific message format is utilized by the communication system of FIG. 1 in order to accomplish this task. In particular, each node within communication system 100 will periodically broadcast "discovery" messages, which have the various PNIDs of piconets determined from the 802.15.3 scan procedure (e.g., via scanning IEEE 802.15.3 beacon fields to determine neighboring piconets and associated PNIDs). More particularly, during operation, logic circuitry 401 associates with a first piconet and periodically instructs transceiver 405 to scan for available piconets (beacons). Once a particular piconet's beacon has been detected, logic circuitry 401 stores the PNID for that piconet in database 403. Logic circuitry then instructs transceiver 405 to broadcast "discovery" messages during a time slot reserved for transmissions within the first piconet. The discovery messages comprise the various PNIDs discovered during the scan procedure.

FIG. 6 illustrates "discovery" message 601 transmitted by nodes within communication system 100 wishing to be discovered by their neighbor. As is evident, during a node's CTA, it will broadcast a standard formatted message as described above in FIG. 3, however, the node will utilize one of the neighboring PNIDs in the PNID field of the message. In addition, during the "command" portion of the message, the node will broadcast its own PNID, DEVID (source address), and other necessary timing information for its piconet's operation. This is evident in FIG. 6, where a node associated with PNID1, broadcasts a message addressed to PNID2 and destination address (DA, which has to be a broadcast address here, e.g. 255 as defined in 802.15.3), with its "command" field comprising a its own PNID (PNID1), and its own device identification (DEVID) (which is the source address (SA)).

Because the superframes for neighboring piconets are separated and do not overlap, devices transmitting discovery messages in their CTA in one superframe are guaranteed not to interfere with other device transmissions in other piconets. In fact, because devices operate in receive mode when they are not transmitting, a device in one piconet will be able to receive or at least hear the transmission of a device in another piconet contingent on whether or not the transmitting device is within its transmission range. Thus, neighboring devices essentially will be able to send a packet to a device that is not a member of its piconet, but one, which is in its physical transmission range, allowing all devices in close proximity to discover each other. Thus, a device can acquire a list of the devices that are within its transmission range, but not members of its piconet by simply listening to discovery messages transmitted by other nodes. A device will simply listen for these discovery transmissions during superframes that are outside of its own. It will acquire the list of these devices, capturing their unique PNID's and device ID's (DEVIDs). Similarly, by default, the device will acquire a list of all the piconets that are within its vicinity.

The above procedure allows for nodes to "listen" to discovery messages broadcast by other nodes, and determine neighbors based on nodes heard from, however, there is no guarantee that neighbor lists are "synchronized" between neighboring devices. More particularly, because a first node "heard" a second node's discovery message, it does not necessarily mean that a second node will have similarly heard a discovery message from the first node. This may simply be due to the fact that the first node has not gotten around to broadcasting a discovery message to the second node yet. In order to make sure all neighbor lists are synchronized, a node receiving a broadcast discovery message will transmit an acknowledgement message during its GTS intended for the specific node that sent it the broadcast message. This acknowledgement technique will prevent message collisions that might otherwise occur at the broadcasting node if multiple nodes sent back immediate acknowledgments to its broadcast. Thus, with the transmission of a discovery message, a first node will be assured of hearing from all nodes that associate the first node as a neighbor.

FIG. 7 is a flow chart showing operation of a node wishing to be "discovered" by neighboring nodes. The logic flow begins at step 701 where a node scans its environment to determine neighboring piconets and associated PNIDs. At step 703, the PNIDs are stored in database 403 and are utilized during transmissions of "discovery" messages. In particular, at step 705 a neighboring PNID is determined from database 403 and a "discovery" message is transmitted to all neighboring nodes. As discussed above, the discovery message comprises a neighboring PNID, the node's PNID, and the node's unique device identification (SA). Additionally, the discovery message may be acknowledged by a data packet from a node receiving the discovery message so that the node transmitting the discovery message can determine all other nodes hearing the discovery message. It should be noted that even though a node is broadcasting a discovery message the node continues monitoring for discovery messages transmitted by other nodes within other piconets; and responds to any received discovery message with an acknowledgment.

Figure 8:
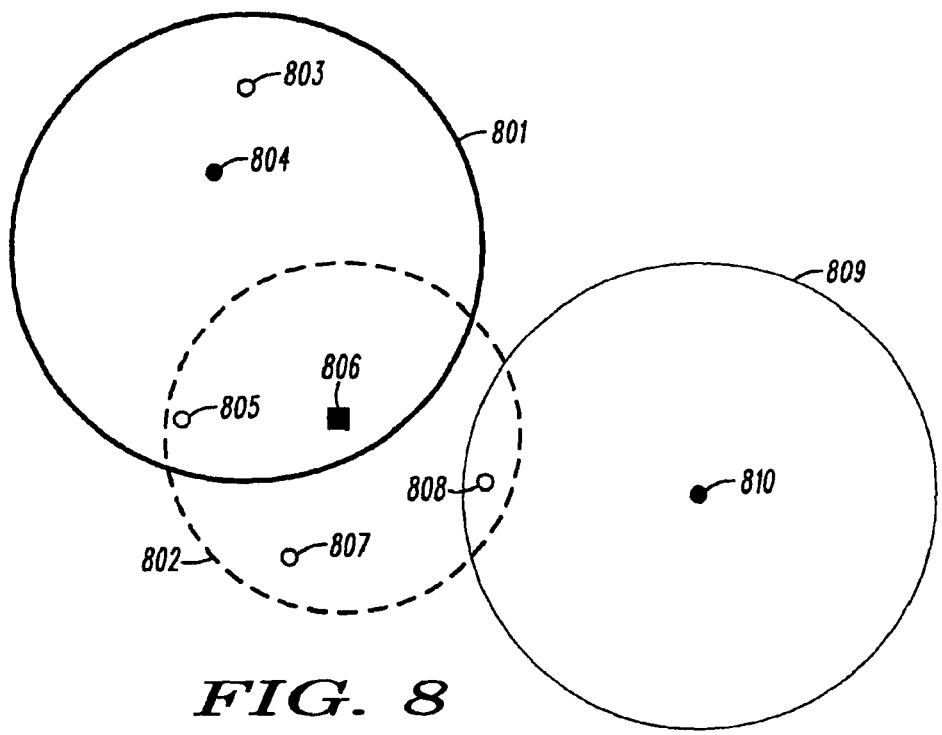
FIG. 8 is a more-detailed block diagram of a piconet communication system.
Figure 9:
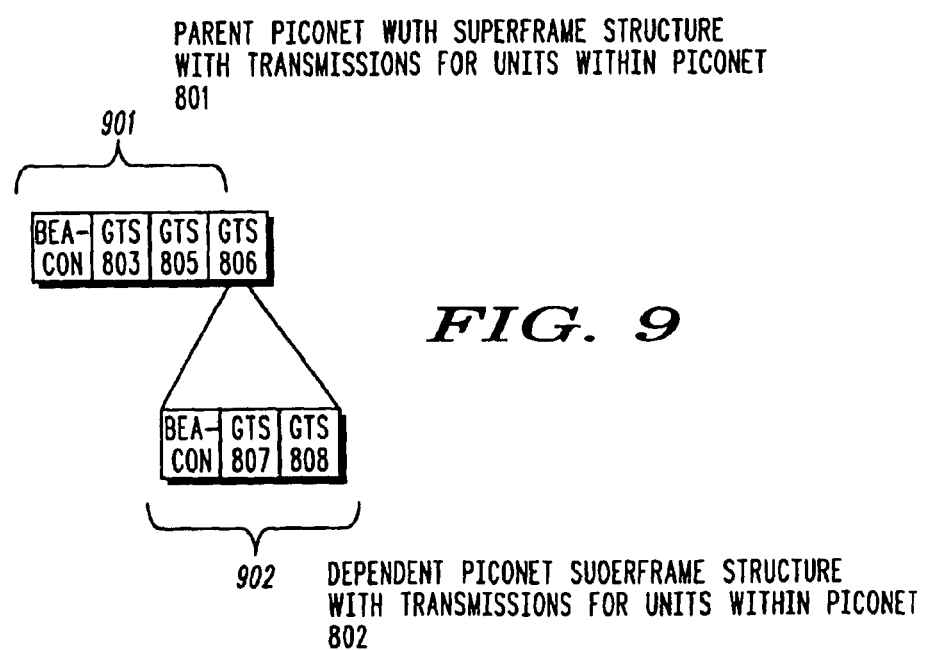
FIG. 9 illustrates a transmission scheme for the communication system of FIG. 8.

In yet a further solution for nodes to discover neighboring nodes within different piconets, each device of a piconet can request to become a dependent piconet controller (PNC). FIG. 8 illustrates a dependent piconet 802 connected to its parent piconet 801 through its controller 806. Node 806 is just a normal device in piconet 801, but is a controller of piconet 802. There also exists a third piconet 809 and a controller 810 of that piconet. FIG. 9 reveals the superframe structures 901 and 902 of the parent piconet and dependent piconets. By becoming a dependent PNC and effectively starting its own piconet, a device would be able to acquire a list of all the devices that are within its transmission range and that are capable of associating with it to join its piconet.

Figure 10:
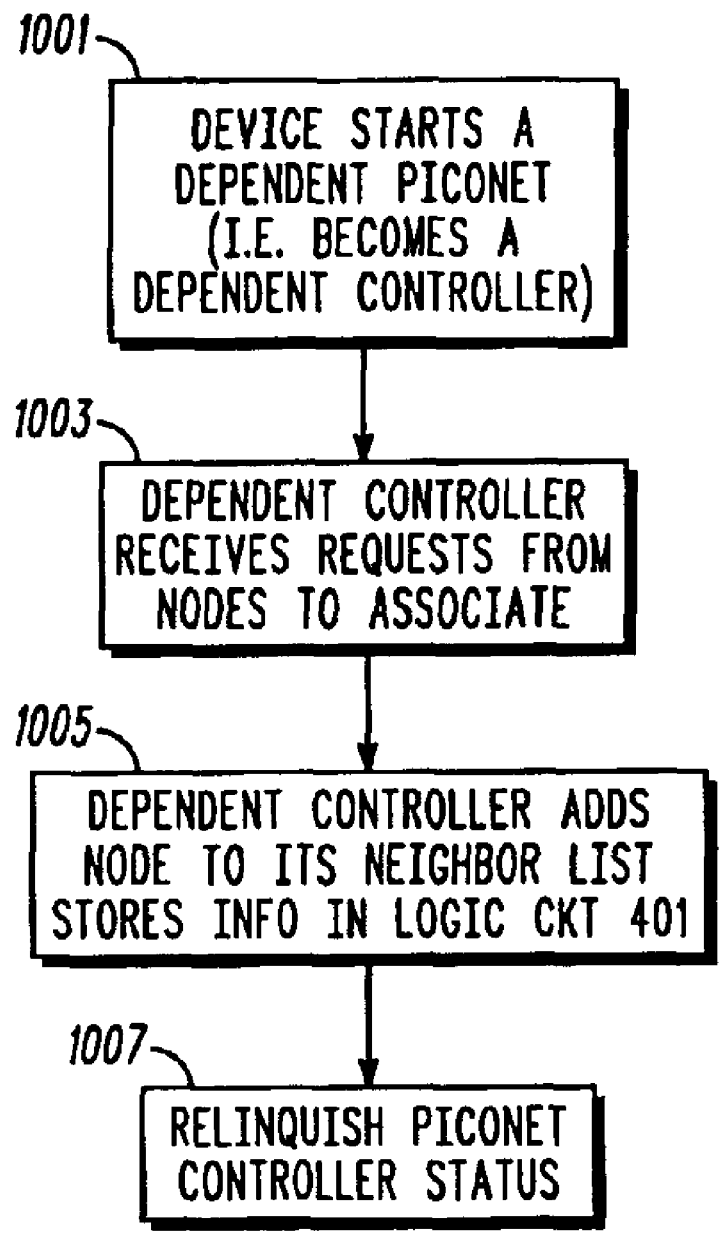
FIG. 10 is a flow chart showing operation of the communication system of FIG. 8.

FIG. 10 is a flow chart showing the operation of a dependent controller discovering its neighboring nodes. It is assumed that logic circuitry within a node associates the node with a first piconet controller and then provides it the capability to become its own dependent controller. The logic flow begins at step 1001 where logic circuitry instructs the node to become a dependent piconet controller. At step 1003, logic circuitry 401 receives requests for nodes to become associated with the dependent piconet controller. At step 1005, logic circuitry 401 stores the identification of these devices within database 403.

It should be noted that in order for all neighboring nodes to associate with the node becoming a dependent piconet controller, there must exist mechanisms that require any node hearing a dependent piconet controller to associate with that controller. This situation exists in prior-art piconets for nodes that are unassociated with any controller. More particularly, if unassociated, the node will just join the dependent piconet. However, if a member of another piconet, the node has to find the existence of the dependent piconet via scan mode operation Once found, the node must then associate with the dependent piconet. One way to require this is to include a flag in the D-PNC beacon that indicates a particular node is a dependent piconet. This would act as a trigger to inform pre-associated nodes that a device is trying to build up its neighbor list. This way the node will know it will need to disassociate from its present piconet (nodes can only be a member of one piconet at a time . . . 802.15.3 convention) so that it can join the dependent piconet and build up its neighbor list as well.

The status of dependent PNC's are temporary, just long enough for a device to acquire all of its "ear shot" neighbors and possibly completing any ranging or communication responsibilities. The acquisition of neighbors allows the node to determine those neighboring nodes within "ear shot". After this point, the dependent controller device would relinquish its PNC status and return to simply functioning as a device in a single piconet (step 1007). The dependent PNC functionality can then be passed, similar to a token passing in token ring networks, to another member of its piconet, which performs a similar operation to discover its neighbors.

While the invention has been particularly shown and described with reference to a particular embodiment, it will be understood by those skilled in the art that various changes in form and details may be made therein without departing from the spirit and scope of the invention. It is intended that such changes come within the scope of the following claims.

What is claimed is:

1. A method for finding neighboring nodes within a second piconet while being associated with a first piconet, the method comprising the steps of:

associating a node with the first piconet;

determining a neighboring piconet identification; and broadcasting, by the node, a discovery message during a time slot reserved for transmissions within the first piconet, wherein the discovery message comprises the neighboring piconet's identification, the first piconet's identification, and the identification of the node.

2. The method of claim 1 further comprising the step of:

broadcasting, within the message, data requiring an acknowledgment; and determining those neighboring nodes that responded to the data requiring the acknowledgment.

3. The method of claim 1 wherein the step of determining the neighboring piconet identification comprises the step of scanning IEEE 802.15.3 beacon fields to determine neighboring piconets and associated PNIDs.

4. The method of claim 1 further comprising the steps of:

monitoring for discovery messages transmitted by other nodes within the second piconet; and responding to any received discovery message with an acknowledgment.

5. An apparatus for finding neighboring nodes within a second piconet while being associated with a first piconet, the apparatus comprising:

logic circuitry associating a node with the first piconet and determining the second piconet's identification; and a transceiver broadcasting a message during a time slot reserved for transmissions within the first piconet, wherein the message comprises the second piconet's identification, the first piconet's identification, and the identification of the node.

6. The apparatus of claim 5 wherein the transceiver additionally broadcasts within the message, data requiring an immediate acknowledgment, and wherein the logic circuitry determines nodes that responded to the data requiring the immediate acknowledgment.

* * * * *

UNITED STATES PATENT AND TRADEMARK OFFICE
CERTIFICATE OF CORRECTION

| | | |
|---|---|---|
| PATENT NO. | : 6,925,064 B2 | Page 1 of 1 |
| APPLICATION NO. | : 10/660393 | |
| DATED | : August 2, 2005 | |
| INVENTOR(S) | : Lance E. Hester et al. | |

It is certified that error appears in the above-identified patent and that said Letters Patent is hereby corrected as shown below:

Col. 1, Line 5
In the specification, after the title and before the heading "FIELD OF THE INVENTION" the following paragraph should be inserted:

STATEMENT REGARDING FEDERALLY
SPONSORED RESEARCH OR DEVELOPMENT

This invention was made with United States Government support under 70NANB2H3001 awarded by the National Institute of Standards and Technology (NIST). The United States Government has certain rights in the invention.

Signed and Sealed this

Thirteenth Day of January, 2009

JON W. DUDAS
*Director of the United States Patent and Trademark Office*